Figure 1:
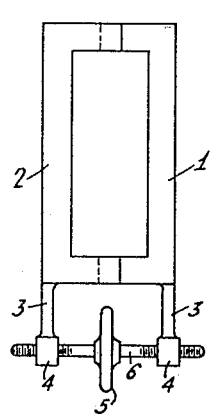

Aug. 29, 1933.  H. G. THILO  1,924,700

DIAPHRAGM FOR APPARATUS FOR PICTURE TELEGRAPHY

Filed April 5, 1930

INVENTOR
HANS GEORG THILO
BY
ATTORNEY

Patented Aug. 29, 1933

1,924,700

UNITED STATES PATENT OFFICE 1,924,700

DIAPHRAGM FOR APPARATUS FOR PICTURE TELEGRAPHY

Hans Georg Thilo, Berlin-Steglitz, Germany, assignor to Siemens & Halske, Aktiengesellshaft, Siemensstadt, near Berlin, Germany, a corporation of Germany Application April 5, 1930, Serial No. 441,790, and in Germany March 18, 1929

4 Claims. (Cl. 178—6)

In apparatuses for picture telegraphy, which operate according to the photographic process, there is inserted between the photo-relay and the picture cylinder a diaphragm which is reproduced by optical means on the film and determines the size and form of the individual light points composing the picture. In this connection it was discovered that even small variations of the dimensions of the diaphragm influence the image in extraordinary strong manner. Thus, for instance, there are revealed on the received picture light strips if the width of the diaphragm is less than the pitch of the helical line which is described by the light point of the receiving cylinder. The reason therefor is that in that case a more or less large part of the light rays is covered by the diaphragm so that thereby part of the photographic paper remains unblackened. In the reverse case, if the width of the diaphragm is greater than the pitch of the luminous ray scanning in a helical line, parts of the film are doubly illuminated and the image shows dark strips. These inexactitudes are particularly hard to avoid for the reason that the pitch of the scanning line and the size of the diaphragm must be often changed in order to obtain a different type of analyzing. It is however impossible with exchangeable diaphragms to insure for each analyzing faultless pictures.

According to the invention, the opening of the diaphragm is rendered continuously variable with the result that the light spot may receive for each pitch of the scanning spiral the exact correct size without a complicated exchange of the diaphragm.

A simplification and facilitation of the exact adjustment of the opening of the diaphragm in receivers may further be insured according to the invention in the manner that the lateral limiting edges of the diaphragm opening are developed and dimensioned thus that adjacent rows of picture points overlap one another at the limiting region and that the blackening of the limiting regions corresponds to a value of transition between the blackenings of adjacent rows of picture points disposed in the same height. The purpose of this measure is to render harmless for the perception of the picture the white and black lines of the intermediate spaces or overlappings which result from an inexact adjustment of the diaphragm. The lines disturb the effect of the picture only if they are in strong contrast to the adjacent parts of the picture. For this reason the lateral borders of the diaphragm are given a, for instance, wedge-like course with the result that there show up, at the lines produced by the superposition, half-tone values, which disturb no longer, since the sharp corners between the helical rotational paths disappear and always blend with one another.

Figs. 1–4 show some embodiments by way of example of the invention.

In Fig. 1 are provided two U-formed parts, forming a rectangular diaphragm on whose extensions 3 are provided screw nuts 4. By means of an adjusting screw 5 which is disposed on a screw spindle 6 with a right and left-hand thread, the cross-section of the diaphragm may be varied by means of a right or left-hand turning.

Figure 2:
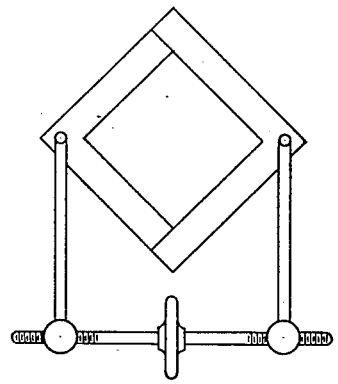

Fig. 2 shows a square diaphragm in which the relation of the sides with respect to one another remains unchanged.

Figure 3:
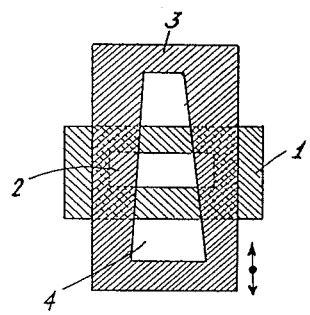

In Fig. 3, the diaphragm plate 1 has a cut-out section 2 of rectangular form. Before or behind this diaphragm is disposed a second movable diaphragm plate 3 which has a cut-out 4 of wedge-like form. Due to the oblique position of the edges there takes place a certain small overlapping of the rows of light points showing on a picture cylinder, but whereby, as mentioned and explained above, the blackening corresponds only to a half-tone respectively transition value.

Figure 4:
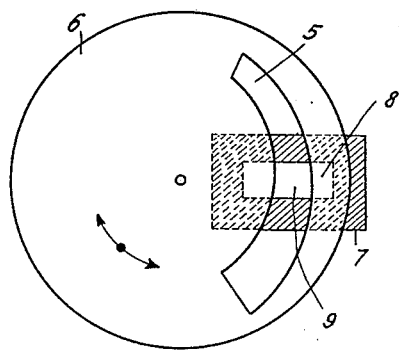

Fig. 4 shows another embodiment in which there is arranged rotatably in front of the plate 7 with rectangular opening a disk 6 wherein is disposed the wedge-shaped cut-out opening 5 which itself is curved. By means of the rotation of the disk 6, the diaphragm opening proper 9 may be adjusted.

Having now described my invention, what is claimed is:

1. A diaphragm construction for defining a light beam comprising, in combination, a first element having a rectangular shaped opening with fixed longitudinal and horizontal dimensions, a second element having an elongated wedge-like opening therein bounded on two sides by spirals arranged transverse to the first named element, and means for moving the second element transversely with respect to the opening in the first element so as to screen portions of the first opening to vary the effective area of the opening provided by each of the elements by retaining one dimension fixed and the other variable.

2. In a diaphragm construction for defining a light beam, a first screening element having a substantially rectangular shaped opening therein, a second screening disk element arranged to cover the opening in the first element, said disk having a wedge shaped opening bounded on two sides by spirals of which one is of constant radius, said opening extending throughout a portion of the circumference thereof for permitting varying areas of the first opening to become uncovered, and means for progressively varying the area of the first opening uncovered by the disk element by varying one dimension only thereof through a rotation of the disk element.

3. A diaphragm construction for defining a light beam comprising in combination a first element having a substantially rectangular shaped opening with fixed longitudinal and horizontal dimensions, a second element having an elongated opening therein bounded on two sides by spirals of which one is of decreasing radius and the other of increasing radius, said second opening being arranged transverse to the first named opening, and means for moving the second element transversely with respect to the opening in the first element so as to screen portions of the first opening to vary the effective area of the opening provided by each of the elements by retaining one dimension fixed and the other variable.

4. A diaphragm construction for defining a light beam which comprises a first fixed element having a substantially rectangular shaped opening therein, a disk element having an elongated wedge-like opening therein, said wedge-like opening having two sides bounded by oppositely disposed spirals, and means for moving the disk element relative to the first element in transverse direction thereto with respect to the opening in the first element so as to screen portions of the opening in the first element to vary the effective area of the opening provided by each of the elements by retaining one dimension fixed and the other variable.

HANS GEORG THILO.